INVENTOR
Randolph W. Driggers
BY
ATTORNEY

Sept. 6, 1966  R. W. DRIGGERS  3,270,474
EXPANSION JOINT COVER
Filed Sept. 27, 1963  2 Sheets-Sheet 2
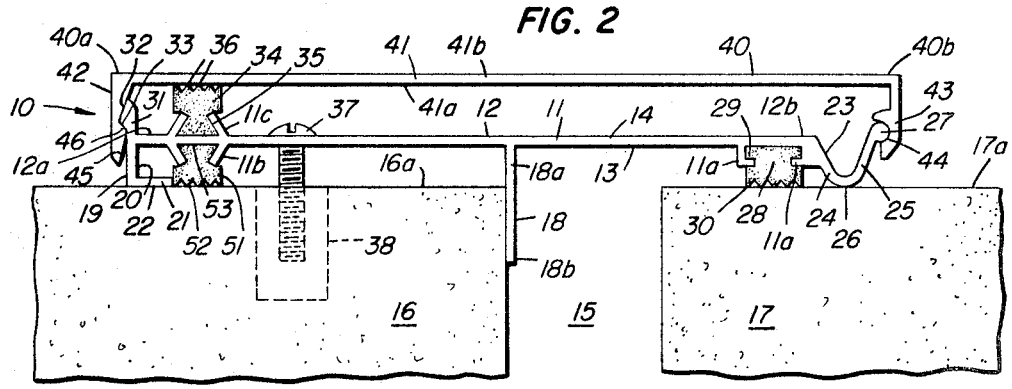
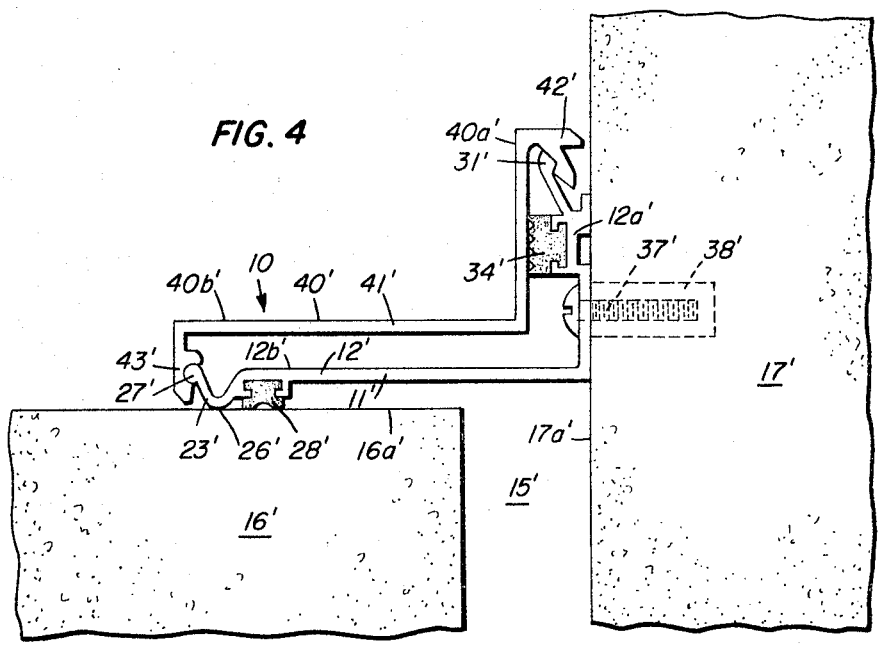
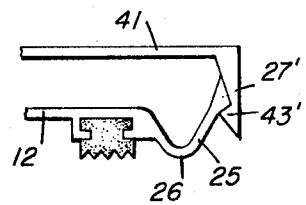
INVENTOR
Randolph W. Driggers
BY *John B. Summerant*
ATTORNEY

United States Patent Office

3,270,474
Patented Sept. 6, 1966

3,270,474
EXPANSION JOINT COVER
Randolph W. Driggers, Doraville, Ga., assignor to Miscellaneous Manufacturing Corporation, Tucker, Ga., a corporation of Georgia
Filed Sept. 27, 1963, Ser. No. 312,213
7 Claims. (Cl. 52—395)

The present invention relates to cover assemblies for covering adjacent portions of structural bodies which are prone to vary in position relative to each other.

In constructing buildings for example, through use of a plurality of structural bodies or sections, it is often important to space the individual structural bodies or sections from each other, whereby portions of the bodies confront each other across an intermediate zone which tolerates expansion, vibration, or other relative movement of the several bodies. The confronting surfaces of the structural bodies are sometimes joined by a plastic bonding agent, or the space therebetween is filled with a resilient material or packing, and in other instances, the bodies are merely separated by an unfilled space, so that relative movement of the structural bodies can be tolerated. A cover often is needed for refining the structure and particularly to conceal in a satisfactory manner the area in which the structural bodies have their proximate ends. An expansion joint of course allows relative movement of the bodies in response to temperature changes and thereby arrests cracking when, for example, one or both of the structural bodies individually is a monolith of concrete or one or both individually is made of a plurality of bricks, concrete blocks, or cinder blocks joined together by means of a cementing or bonding agent such as mortar.

Whether structures are being formed from sections or structural bodies of concrete or other masonry, or whether other material or materials amounting to structural bodies or sections such as of wood, metal or alloy, or plastic, or bodies of other substance or substances are being employed, it frequently becomes desirable to space these structural bodies for relative movement of the structural bodies to occur, as need be, in the absence of introduicng appreciable stress one to the other. In forming joints which tolerate this movement, whether the joints be for outdoor or indoor purpose, there has been an ever increasing demand for improved covers which conceal the area where the proximate ends of the bodies lie and which permit relative movement of the proximate ends of the bodies while providing an adequate finishing touch to the overall structure.

With the foregoing in mind, it is an object of the present invention to provide an indoor or outdoor cover assembly for structural bodies which readily lends itself to installation and, when installed, effectively covers mounting means for the unit as well as the zone between proximate portions of structural bodies and forms a joint with the structural bodies which permits the proximate portions of the bodies to move toward and away from each other while concealed.

Another object of this invention is the provision of a cover assembly of the character indicated wherein the cover assembly has a base member which is adapted to be attached to and bear firmly against one of the structural bodies and to slidably engage the other of the structural bodies, the slidable engagement being such that the base member offers negligible resistance to relative movement between itself and the structural bodies when the base member and the structural body are slidably engaged.

A further object is that of providing a cover assembly of the character indicated wherein the base member includes at least one sealing strip for seating against a corresponding one of the structural bodies to close off the zone between the proximate portions of the structural bodies.

A further object is the provision of a cover member of the character indicated in which the base member includes a sealing strip for slidably engaging one of the structural bodies so that the structural body and the strip are permitted to undergo relative sliding movement in a direction transversely of the strip while the base member bears upon the structural bodies and covers the zone between the proximate portions of the structural bodies.

Another object is that of providing a cover assembly having a base member and a cover member which substantially fully conceals the base member in an interengaging relation to the base member thus providing a trim effect while concealing fastening means which mount the base member to one of the structural bodies.

Another object is to provide a cover assembly having a base member and a cover member wherein the base member and cover member respectively have outwardly facing edgings and inwardly facing edgings which interlock for securing the cover member to the base member and are concealed by the cover member when the edgings are interlocked.

Another object of this invention is that of providing a cover assembly wherein a cover member thereof hingedly engages a base member and further includes means on the cover member and base member for said members to wedgingly engage each other and attain an interlocking position in response to being hinged toward each other.

Another object is to provide a cover assembly having a base member and a cover member wherein the cover member is interengaged with the base member against biasing means exerting thrust upon the members and thus arresting relative movement of the members in the interengaged position.

Other objects in part will be obvious and in part pointed out more fully hereinafter.

In the accompanying drawing representing embodiments of the invention which are presently preferred:

FIGURE 2 is a transverse corresponding one end elevation of the cover assembly in FIGURE 1, but with the cover member in latched position;

FIGURE 3 is a transverse fragmentary one end elevation of a second preferred cover assembly; and FIGURE 4 is a transverse corresponding one end elevation of a cover assembly adapted to occupy a corner position.

Figure 1:
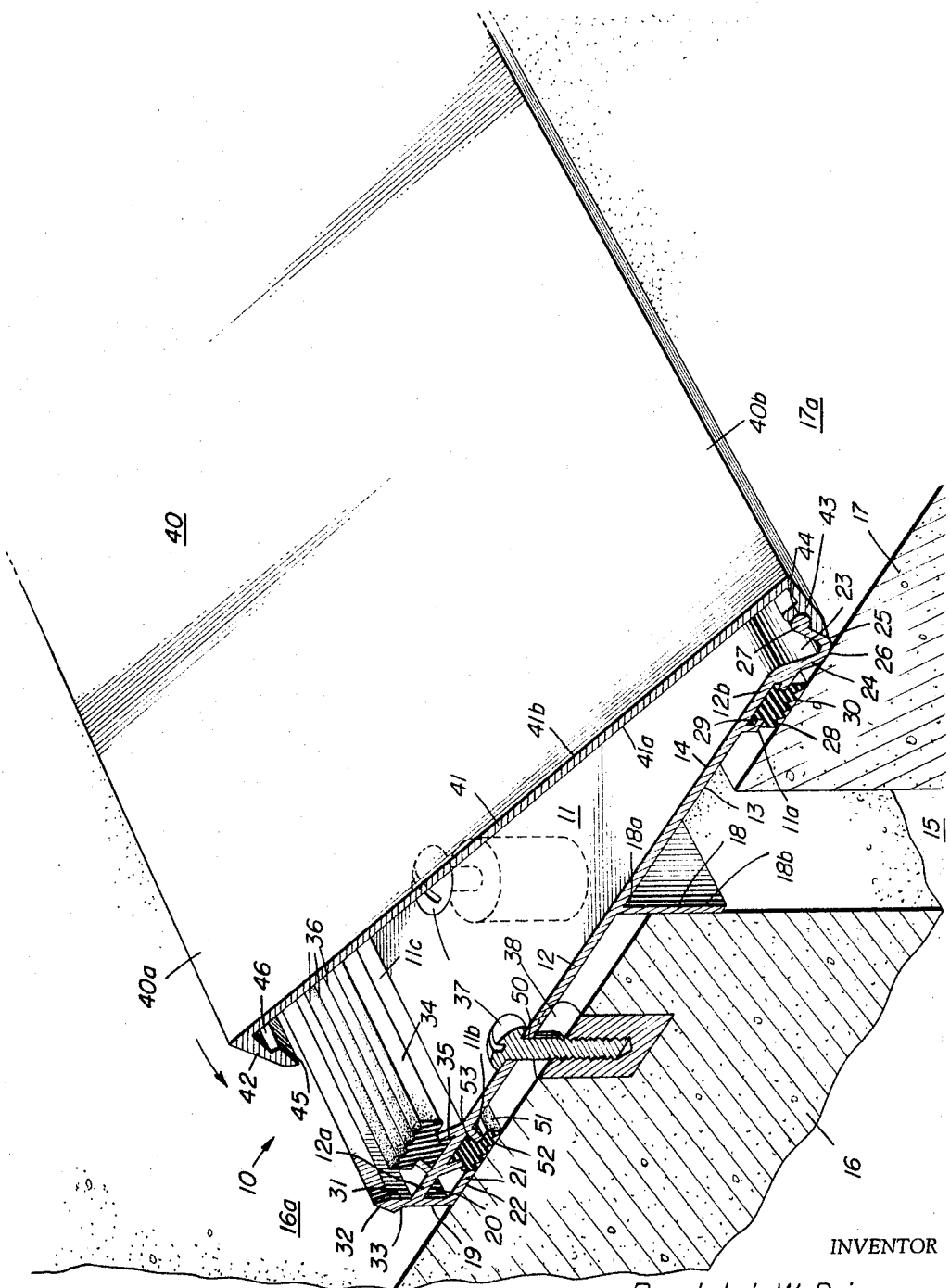
FIGURE 1 is a broken away one end perspective view of a first preferred cover assembly with the cover member in an unlatched position.

The cover assembly 10 represented in the accompanying drawings thus is adapted to cover relatively movable structural bodies 16 and 17 confronting each other across a zone 15 between the structural bodies and which vary in distance from each other across the zone in accordance with relative movement of the bodies. Cover assembly 10 includes a base member 11 and a cover member 40, each preferably formed by extrusion of a material such as aluminum base alloy, other metal, synthetic resin, or the like, through an extruding die corresponding to the transverse cross section of the integral portions of the member. A web 12 of the base member having inner face 13 and outer face 14 is adapted to extend along faces 16a and 17a of the structural bodies, which faces of the bodies are in extension or prolongation of each other interrupted by the zone 15. More particularly, web 12 is adapted lengthwise to extend along the length of the zone 15 and transversely to extend across the zone 15 and cover this zone and the adjacent portions of the faces 16a and 17a of the structural bodies. A pair of projections 19 and 23 coextending longitudinally with the web 12 in spaced parallel relation to each other have inner portions 20 and 24 integral with the transversely opposed outer portions 12a, 12b of the web and have outer faces 22 and 26 spaced outwardly substantially equidistantly from the inner face 13 of the web.

Projection 19 more particularly in the cover assembly 10 is an L-shaped component having a first leg 20 generally perpendicular to the base member web 12 and integral at inner end with the web portion 12a, and having a second leg 21 generally parallel to the base member web and coextending transversely inwardly from the outer end of the first leg 20 for a short distance with the base member web. Lengthwise, the L-shaped component coextends with the base member web substantially for the entire length of the base member web and provides outer face 22 on the second leg 21. Also, in the cover assembly 10, projection 23 of the base member is a substantially U-shaped component having one of its legs 24 integral with transverse portion 12b of the base member web and the other of its legs 25 integral with an edging 27 of the base member which, later herein, will be more fully described. Face 26 of the projection, accordingly, is outwardly rounded transversely of the projection. Lengthwise, the U-shaped projection coextends with the base member web substantially for the entire length of the base member web.

Between the projections 19 and 23, web 12 is adapted to be mounted on structural body 16 with the outer faces 22 and 26 of the base member respectively contiguous to the faces 16a and 17a and for the base member 11 to bear upon the structural bodies. Mounting of the base member 11 to the structural body 16 is conveniently achieved by drilling a series of holes 50 (see FIGURE 1) through the web 12 spaced from each other longitudinally of the web, such as in the course of installing the cover assembly 10 or at the factory in producing the cover assembly, thus for the web to receive in the holes the shanks of headed fastenings, such as screws 37, having their heads suited to engage the outer surface 14 of the web. Suitably spaced anchoring plugs 38 illustratively are provided securely embedded in the structural body 16 for engaging the shanks of the fastenings 37 and for the fastenings thus to hold the base member in the mounted position wherein the outer faces 22 and 26 of the base member are contiguous respectively to the faces 16a and 17a of the structural bodies on opposite sides laterally of the zone 15.

Cover assembly 10 further includes, as an extension of the base member 11, a resilient sealing strip 28 such as of soft rubber, vinyl chloride, or the like, disposed adjacent to the projection 23 and between the projections 19 and 23. This strip longitudinally coextends parallel with projection 23 throughout substantially the entire length of the latter projection and has a seating face 30 outwardly at least initially from the base member web a short distance beyond the outer face 26 of the projection 23 for contacting face 17a on the structural body 17 when the outer face 26 of the projection is contiguous to the latter body face. An integral channel component 29 of the base member, and suitably having leg extensions 11a respectively from portion 12b of the base member web and from leg 24 of projection 23, longitudinally coextends parallel with the latter projection immediately transversely inwardly from the latter projection for substantially the full length of the latter projection. Legs 11a converge toward each other for constricting the channel 29 and for the channel to receive and retain an inner enlarged end of the resilient sealing strip 28 behind the channel legs.

When the cover assembly 10 is mounted by means of the fastenings 37 to structural body 16, face 26 may accordingly contact the structural body face 17a or otherwise be contiguous to the latter body face while seating face 30 of the resilient strip 28 is held seated sealingly by the fastenings 37 against the latter body face. The structural bodies 16 and 17 thus can shift relative to each other transversely of the projection 23 and resilient sealing strip 28. In certain embodiments this resilient strip may be omitted, with face 26 of projection 23 providing bearing support.

In order further to seal zone 15 from the outside of the cover assembly 10, base member 11 also includes as an extension thereof a resilient sealing strip 51 such as of soft rubber, vinyl chloride, or the like, adjacent to the projection 19 and situated between the projections 19 and 23. Strip 51 coextends parallel with projection 19 throughout substantially the entire length of the latter projection and has a seating face 52 outwardly at least initially from the base member web a short distance beyond the outer face 22 of the projection 19 for contacting face 16a of the structural body 16 when the outer face 22 of the projection is contiguous to the latter body face. An integral channel component 53 of the base member, and suitably having leg extensions 11b from web portion 12a, longitudinally coextends parallel with projection 19 immediately transversely inwardly from the latter projection for substantially the full length of the latter projection. Legs 11b converge toward each other for constricting the channel 53 and for the channel to receive and retain an inner enlarged end of the resilient sealing strip 51 behind these channel legs.

Face 22, under the mounting effect of fastenings 37 on the cover assembly 10, accordingly may contact the structural body face 16a or otherwise be contiguous to the latter body face while seating face 52 of the resilient strip 51 is held seated sealing by the fastenings 37 against the latter body face. In certain embodiments this resilient strip may be omitted, with face 22 of projection 19 providing bearing support.

As represented, the base member 11 further includes an aligning component or flange 18 for contacting and aligning the base member against the structural body 16 in zone 15. The aligning component has an inner end 18a itegral with web 12 in an intermediate position relative to the web and having a portion 18b outwardly from the inner side 13 of the web. The plane of the outer faces 22 and 26 of the base member intersects the aligning component between the inner end 18a and outer portion 18b thereof for the aligning component to engage the structural body 16 while projecting into the zone 15.

Base member 11 further includes outwardly facing parallel edgings 27 and 31 integral therewith adjacent to projections 19 and 23 and coextending longitudinally with the base member web 12 for the base member to be maintained in interlocking engagement with the cover member 40.

Cover member 40 includes a cover member web 41 having an inner face 41a and an outer face 41b opposing the inner face of the cover member web. Transversely opposed parallel longitudinally coextending flanges of the cover member web, integral with outermost opposed portions 40a, 40b of the cover member web have inwardly facing transversely opposed parallel cover member edgings 42 and 43 on the same side of the cover member web and correspondingly interlock with the outwardly facing edgings 31 and 27 of the base member 11.

To maintain the interlocking edgings of the cover member and the base member firmly against each other a resilient biasing means 34 is disposed between the web 12 of the base member and web 41 of the cover member in thrust transmitting relation to the webs for biasing the cover member outwardly. As shown, at least one of the cover member and base member, and more particularly the base member, includes spaced parallel flanges 11c integral with the web thereof and longitudinally coextending with the web. Flanges 11c are inclined toward each other from the web 12 and are parallel with the outwardly facing edgings 27 and 31 of the base member. A channel formed by the flanges 11c and the base member web 12 securely receives in a female relation a correspondingly male shaped enlarged inner portion 35 of a resilient strip 34. The strip has fingers 36 longitudinally in contact with inner face 41a of the cover member web, thus to contact and bias the cover member web away from the base member web and firmly maintain the interlocking edgings of the cover member and base member against each other. In certain embodiments resilient biasing means 34 may be omitted and full reliance placed upon the interlocking effect of the cover member and base member edgings themselves to maintain the cover member in place.

Advantageously, one of the edgings of the base member and the corresponding interlocking edging of the cover member individually take male and corresponding female form and preferably form of a semi-cylindrical bead 27 coextending longitudinally and integrally with the web of the corresponding one of the members, and form of a semi-cylindrical groove 44 conforming to the bead 27 and which groove coextends longitudinally and integrally with the web of the other of the members, for hingedly engaging and interlocking the members. Thus, as shown, semi-cylindrical bead 27 is a transversely outwardly directed bead integral with an outer portion of projection 23 transversely outwardly from web 12 and coextends with the latter web, and semi-cylindrical groove 44 is a transversely inwardly directed groove in the edging 43 of the cover member and coextends longitudinally with the cover member web 41. Likewise edgings 31 and 42 of the base member and cover member also individually take male and corresponding female form. As shown, edging 31 has an outwardly facing wedging surface 32 and latching surface 33 together providing a male latch portion longitudinally coextending with the base member web, and edging 42 has an inwardly facing wedging surface 45 and latching surface 46 together providing a female latch portion longitudinally coextending with the cover member web, for the base and cover members while interlocked at the semi-cylindrical bead 27 and groove 44 to move wedgingly against each other along the wedging surfaces 32 and 45 and interlock each other latchingly at the latching surfaces 33 and 46.

In certain embodiments of the invention, bead 27 and groove 44 are dispensed with and edgings having the shapes of edgings 31 and 42 are substituted for the groove and bead. Edging 27' (see FIGURE 3) thus substituted on the base member is an outwardly facing edging and the edging 43' thus substituted on the cover member is an inwardly facing edging, for interlock of the cover member and base member to be achieved, in cooperation with the edgings 31 and 42 as before.

In FIGURE 4, the cover assembly 10' includes a base member 11' having an L-shaped or angular web 12' of which the line of the apex of the web extends longitudinally of the web intermediate the transversely opposed outer web portions 12a' and 12b' so that the base member can extend across zone 15' between structural bodies 16' and 17' in a corner location, the body faces 16a' and 17a' for example being in effect in prolongation of each other in planes at right angles to each other. Likewise, cover member 40' has an L-shaped or angular web 41' of which the line of the apex of the cover member web extends longitudinally of the web intermediate the transversely opposed outer web portions 40a' and 40b' for the cover member to engage and cover the base member. A projection 23' coextends longitudinally with the base member web and has an inner end integral with one of the two transversely opposed outer portions 12a' and 12b' of the web and more particularly portion 12b' of the web. Outer face 26' of the projection is spaced outwardly from the corresponding transverse portion 12b' of the web 12' on one side of the apex of the latter web. A leg of the base member web corresponding to structural body 17' and including the transverse portion 12a' is adapted to be mounted on the latter structural body with face 26' of the base member respectively contiguous to the face 16a of the structural body 16' and for the base member to bear against the structural bodies. Conveniently, headed fastenings 37' extend through openings in the aforementioned leg of the base member web and engage anchor plugs 38' in the structural body 16 for securing the plate member to the latter body, for the plate member to bias against the structural bodies.

The base member 11' further includes outwardly facing parallel edgings 31' and 27' integral therewith adjacent to the opposed transverse portions 12a' and 12b' and coextending longitudinally with the base member web, parallel to the apex of the base member web, for the base member to be in interlocking engagement with the cover member 40'. The cover member correspondingly has inwardly facing transversely opposed parallel edgings 42' and 43' coextending longitudinally with the cover member web, integral with the cover member web portions 40a' and 40b' and parallel to the line of the apex of the cover member web. Edgings 42' and 43' interlock with the outwardly facing edgings of the base member consistent with the embodiment of FIGURES 1 and 2 or of FIGURE 3. A strip 34' of resilient material may be disposed between the cover member web 41' and base member web 12' in the same manner and for the same purpose as described hereinbefore with reference to FIGURES 1 and 2. A resilient sealing strip 28' where included may longitudinally coextend with projection 23' adjacent to this projection transversely inwardly from this projection, the latter sealing strip having a seating face at least initially outwardly from the base member web a short distance beyond the outer face 26' of the projection for contacting face 16a' of the structural body 16' when the face 26' is contiguous to face 16a'.

As many possible embodiments of the invention may be made and as many possible changes may be made in the embodiments hereinbefore set forth, it will be distinctly understood that all matter described herein is to be interpreted as illustrative and not as a limitation.

I claim:

1. An expansion joint cover for first and second structural bodies which confront each other relatively movably across an intermediate zone to be covered: including a base member and a cover member therefor, said base member comprising a rigid web adapted to be secured to one of said structural bodies against displacement relative thereto and having a width sufficient to bridge said intermediate zone and extend in covering relation to faces of said bodies, a first wall coextentive with said web inwardly of one longitudinal marginal edge of said base member, a second wall coextensive with said web inwardly of the opposite longitudinal marginal edge of said base member, each of said walls being disposed to extend toward a structural body, said first wall providing a bearing surface adapted to be engageable with said one structural body for support of said base member thereon, first wall structure extending from said web along one longitudinal edge of said base member and having surfaces defining latching means coextensive therewith, and second wall structure extending outwardly of said web to define the said opposite longitudinal marginal edge of said base member; and said cover member including a web adapted to cover said base member, and first and second transversely opposed parallel edge walls coextending longitudinally with said cover member, one of said edge walls having surfaces interfitting with the said second wall structure of said base member, and the other of said edge walls having surfaces defining a latching means interfitting with said base member latching means; one of said members having wall means projecting therefrom laterally inward of the longitudinal sides thereof and coextensive therewith, and a strip of resilient material secured by said wall means in thrust-transmitting relation to the web of the other of said members biasing said other member in a direction urging the interfitting portions of said base and cover members firmly against each other.

2. An expansion joint cover as in claim 1, wherein said resilient strip securing means comprise spaced parallel flanges integral with one of said webs and extending therefrom to provide a longitudinally coextensive channel occupied by said strip.

3. An expansion joint cover for first and second structural bodies which confront each other relatively movably across an intermediate zone to be covered: including a base and a cover therefor, said base comprising a rigid web secured to one only of said structural bodies against movement relative thereto and having a width sufficient to bridge said intermediate zone and extend in covering relation to a face of both of said bodies, said base having first and second walls coextensive with said web and extending angularly therefrom to be brought into facing relationship with the respective structural bodies and the said second wall being disposed to extend into contiguous relation with the second of said bodies while permitting substantially unrestrained lateral displacement of said body relative to said web, first wall structure extending outwardly of said web and first wall to define one outermost longitudinal edge of said base and having wall surfaces forming a latching member coextensive with said base, second wall structure integral with said second wall and extending outwardly of said web and second wall to define the opposite outermost marginal edge of said base, and wall means integral with said base for the support thereof on said one structural body; and said cover including a web adapted to cover said base, and first and second transversely opposed parallel edge walls coextensive longitudinally with said cover, one of said edge walls having surfaces interfitting with the said second wall structure of the base and the other of said edge walls having wall surfaces defining a latching member interfitting with said base latching member.

4. An expansion joint cover according to claim 3, in which the said second wall of said base has an arcuate shape to establish substantially only line contiguity to said second structural body.

5. An expansion joint cover as in claim 3, wherein said base web has wall means integral therewith and cooperatively related to one of said first and second base walls to define a pocket coextensive with said base and disposed wholly laterally inward of said one base wall, and a resilient member confined within said pocket for engagement with one of said bodies along an area wholly inward of said base wall.

6. An expansion joint cover as in claim 3, wherein said base has confined thereon and includes as an extension therefrom, a resilient sealing strip disposed wholly inward of said second base wall and having a seating face projecting at least initially outwardly from said web a distance beyond the edge of said second base wall for contacting the face of said second structural body for the sealing strip and the structural body to shift relative to each other laterally of said strip while the edge of said second wall is contiguous to the face of said structural body.

7. An expansion joint cover as in claim 3, wherein said base web has spaced parallel flanges disposed laterally inwardly of, and in parallel relation to, one of said first and second base walls, at least one of said flanges having a portion extending towards the other and said flanges and extending portion providing a channel, and a resilient strip confined within said channel to bear against one of said structural bodies.

References Cited by the Examiner
UNITED STATES PATENTS

| | | | |
|---|---|---|---|
| 2,029,549 | 2/1936 | Winterich | 52—287 |
| 2,234,799 | 3/1941 | Eason | 52—466 X |
| 2,800,983 | 7/1957 | Toney | 52—469 X |
| 2,866,527 | 12/1958 | Schilling | 52—395 |
| 2,948,994 | 8/1960 | Thom | 52—278 |
| 3,034,824 | 5/1962 | Schubach | 52—288 X |
| 3,170,268 | 2/1965 | Balzer et al. | 52—395 X |

FOREIGN PATENTS

| | | |
|---|---|---|
| 1,259,585 | 3/1961 | France. |
| 295,593 | 3/1954 | Switzerland. |

RICHARD W. COOKE, JR., *Primary Examiner.*

FRANK L. ABBOTT, *Examiner.*

A. C. PERHAM, *Assistant Examiner.*